(12) United States Patent
Szita

(10) Patent No.: US 11,568,894 B1
(45) Date of Patent: Jan. 31, 2023

(54) REDUCING THE EFFECT OF SPIRAL SYNC MARKS IN NON-COHERENT REPEATABLE RUNOUT

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Gabor Szita, Mountain View, CA (US)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/592,438

(22) Filed: Feb. 3, 2022

(51) Int. Cl.
G11B 5/00 (2006.01)
G11B 5/54 (2006.01)
G11B 21/08 (2006.01)
G11B 5/012 (2006.01)

(52) U.S. Cl.
CPC .............. *G11B 21/08* (2013.01); *G11B 5/012* (2013.01)

(58) Field of Classification Search
CPC ........... G11B 5/00; G11B 5/52; G11B 15/087; G11B 5/54; G11B 5/59633; G11B 5/59638; G11B 5/56; G11B 5/58; G11B 5/5543

USPC ................... 360/75, 31, 55, 77.08
See application file for complete search history.

(56) References Cited

U.S. PATENT DOCUMENTS

| | | | |
|---|---|---|---|
| 7,746,592 B1 * | 6/2010 | Liang | G11B 20/1816 360/75 |
| 8,432,629 B1 | 4/2013 | Rigney et al. | |
| 8,451,697 B1 | 5/2013 | Rigney et al. | |
| 8,724,253 B1 | 5/2014 | Liang et al. | |

* cited by examiner

*Primary Examiner* — Nabil Z Hindi
(74) *Attorney, Agent, or Firm* — Kim & Stewart LLP (57) ABSTRACT

A method for collecting position information in a disk drive having a read head and a disk with a set of spirals formed thereon includes: while the read head crosses a first spiral included in the set of spirals, opening a first frame integration window; while the first frame integration window is open, generating first signals with the read head as the read head crosses over a first set of magnetic transitions; closing the first frame integration window; after closing the first frame integration window, generating second signals with the read head as the read head crosses over a second set of magnetic transitions; and determining a radial position of the read head by integrating amplitudes of the first signals, wherein the first set includes magnetic transitions having a first polarity, and the second set includes two or more magnetic transitions having a second polarity.

20 Claims, 8 Drawing Sheets

REDUCING THE EFFECT OF SPIRAL SYNC MARKS IN NON-COHERENT REPEATABLE RUNOUT

BACKGROUND

In a typical hard disk drive (HDD), servo sectors on the disk are used to provide position information about the location of a magnetic head over a disk surface. A common approach for writing such servo information on one or more disk surfaces in an HDD is referred to as spiral-based self-servo writing, or spiral-based SSW. According to this approach, multiple spiral-shaped servo information patterns (or "servo spirals") are written on at least one disk surface prior to the SSW process. During the SSW process, a magnetic head of the HDD is positioned relative to a disk surface based on timing and position information in the servo spirals, so that the final servo information (the servo sectors) can be written on the disk surface by the magnetic head.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing.

In light of this, in-drive spiral-writing schemes have been employed, in which an HDD itself writes servo spirals prior to performing the SSW process. For example, a set of coarsely positioned spirals may be written by the HDD while the actuator is moved across a disk surface by applying a suitable open-loop voltage profile, or by using velocity control that is based on back electromotive force (back-EMF) feedback. More precisely positioned sets of spirals can then be written in one or more subsequent closed-loop spiral-writing processes, by demodulating signals from the more coarsely positioned sets of spirals. For example, a set of coarse servos spirals, a set of fine servo spirals, and a set of final servos spirals may be progressively written by the HDD itself in this way. The servo sectors are then written on a disk surface by positioning the magnetic head based on the final, most accurately positioned, set of servo spirals in a spiral-based SSW process.

During an SSW process, radial head position is typically determined at each servo spiral crossing by a read head. Specifically, the radial head position at a particular servo spiral is computed by finding the center of weight of the integrated magnetic transition amplitudes of the servo spiral. Typically, spirals have embedded sync marks that are needed for timing purposes. These sync marks are magnetic transitions formed on a disk that have inverted polarity relative to the other magnetic transitions forming the servo spiral. When this is the case, during the amplitude integration process, the magnetic transitions of the sync marks are integrated with opposite sign compared to the magnetic transitions forming the rest of the servo spiral. As a result, sync marks have been found to cause a significant drop in amplitude during spiral amplitude integration. Because sync marks are not positioned symmetrically before and after the ideal center of a given servo spiral, the center of weight for each servo spiral is distorted by the relative location of the ideal center of the servo spiral and the sync marks included in the servo spiral. Further, in each servo spiral crossing, sync marks are typically positioned differently relative to the ideal center of the servo spiral. Thus, for each servo spiral crossing, the distortion of the center of weight is affected differently by the sync marks included therein. This random distortion of amplitude integration causes increased non-coherent repeatable runout, which is the component of position-error signal that repeats during each disk revolution and is different on adjacent tracks. During an SSW process, non-coherent repeatable runout is a major source of position-error signal, and ideally is minimized. However, sync marks provide necessary timing information for SSW processes and cannot be eliminated. Consequently, there is a need in the art for reducing the generation of non-coherent repeatable runout by sync marks during SSW.

SUMMARY

One or more embodiments provide systems and methods for reducing the effect of sync marks on non-coherent repeatable runout during an SSW process. According to the embodiments, an amplitude integration process includes positioning spiral frame integration windows so that servo spiral sync marks occur partially or completely outside of the spiral frame integration windows. As a result, most or all of the magnetic transitions of the sync marks are not included in the amplitude integration of the servo spiral, and do not affect spiral amplitude integration values. Consequently, non-coherent repeatable runout associated with each servo spiral is significantly reduced compared to prior art techniques.

According to an embodiment, a method for collecting position information in a disk drive having a read head and a disk with a set of spirals formed thereon includes: while the read head crosses a first spiral included in the set of spirals, opening a first frame integration window; while the first frame integration window is open, generating first signals with the read head as the read head crosses over a first set of magnetic transitions; closing the first frame integration window; after closing the first frame integration window, generating second signals with the read head as the read head crosses over a second set of magnetic transitions; and determining a radial position of the read head by integrating amplitudes of the first signals, wherein the first set includes magnetic transitions having a first polarity, and the second set includes two or more magnetic transitions having a second polarity.

A disk drive, according to an embodiment, includes: a read head, a disk with a set of spirals formed thereon, and a controller. The controller is configured to perform the steps of: while the read head crosses a first spiral included in the set of spirals, opening a first frame integration window; while the first frame integration window is open, generating first signals with the read head as the read head crosses over a first set of magnetic transitions; closing the first frame integration window; after closing the first frame integration window, generating second signals with the read head as the read head crosses over a second set of magnetic transitions; and determining a radial position of the read head by integrating amplitudes of the first signals, wherein the first set includes magnetic transitions having a first polarity, and the second set includes two or more magnetic transitions having a second polarity.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
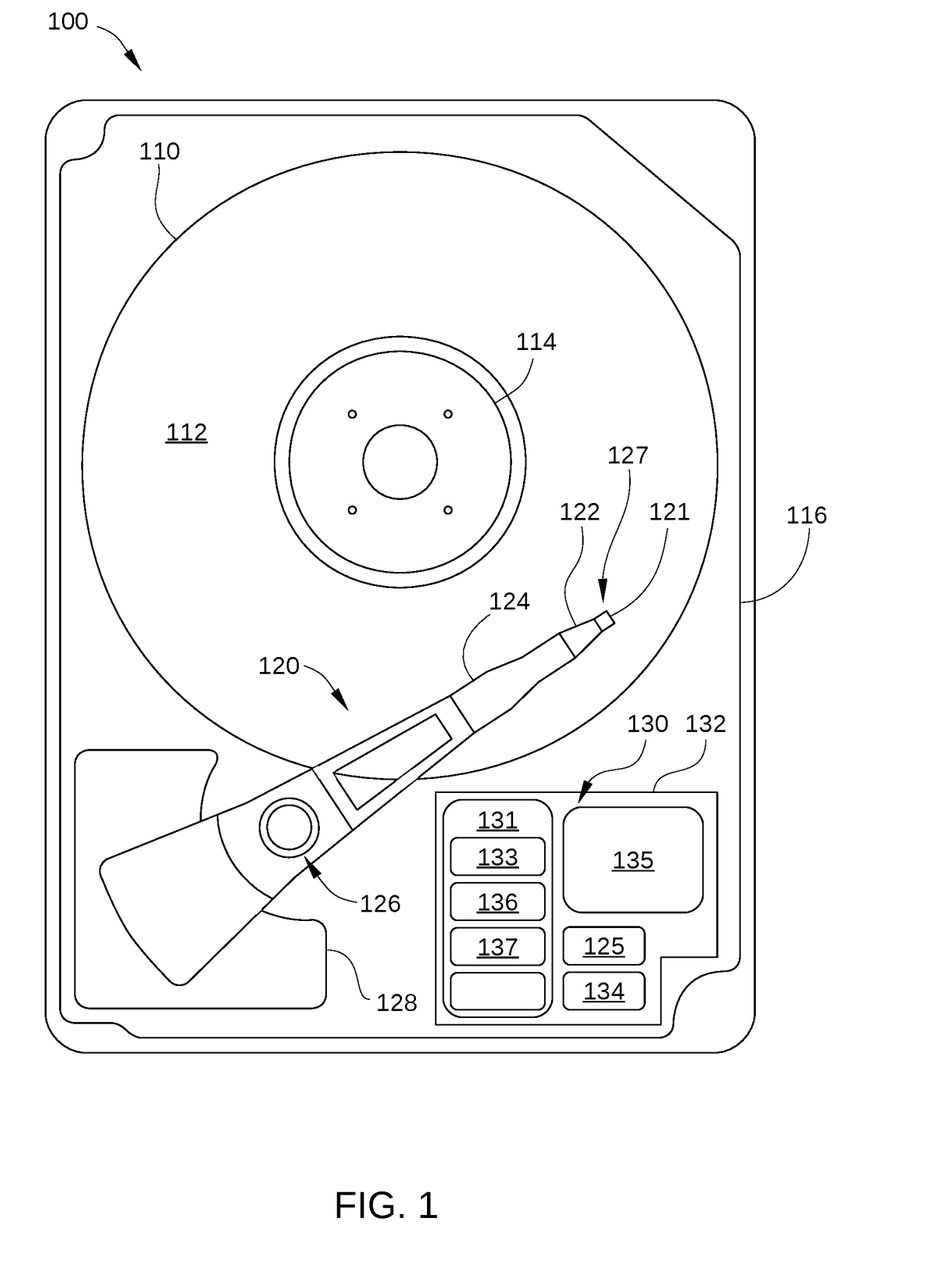
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track.

Spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown in FIG. 1) could be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read/write channel 137, a microprocessor-based controller 133, random-access memory (RAM) 134 (which may be a dynamic RAM and used as one or more data buffers) and/or a flash memory device 135, and, in some embodiments, a flash manager device 136. In some embodiments, read/write channel 137 and microprocessor-based controller 133 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in the servo wedges (not shown) on the recording surface 112 as a reference. One embodiment of a recording surface 112 is illustrated in FIG. 2.

Figure 2:
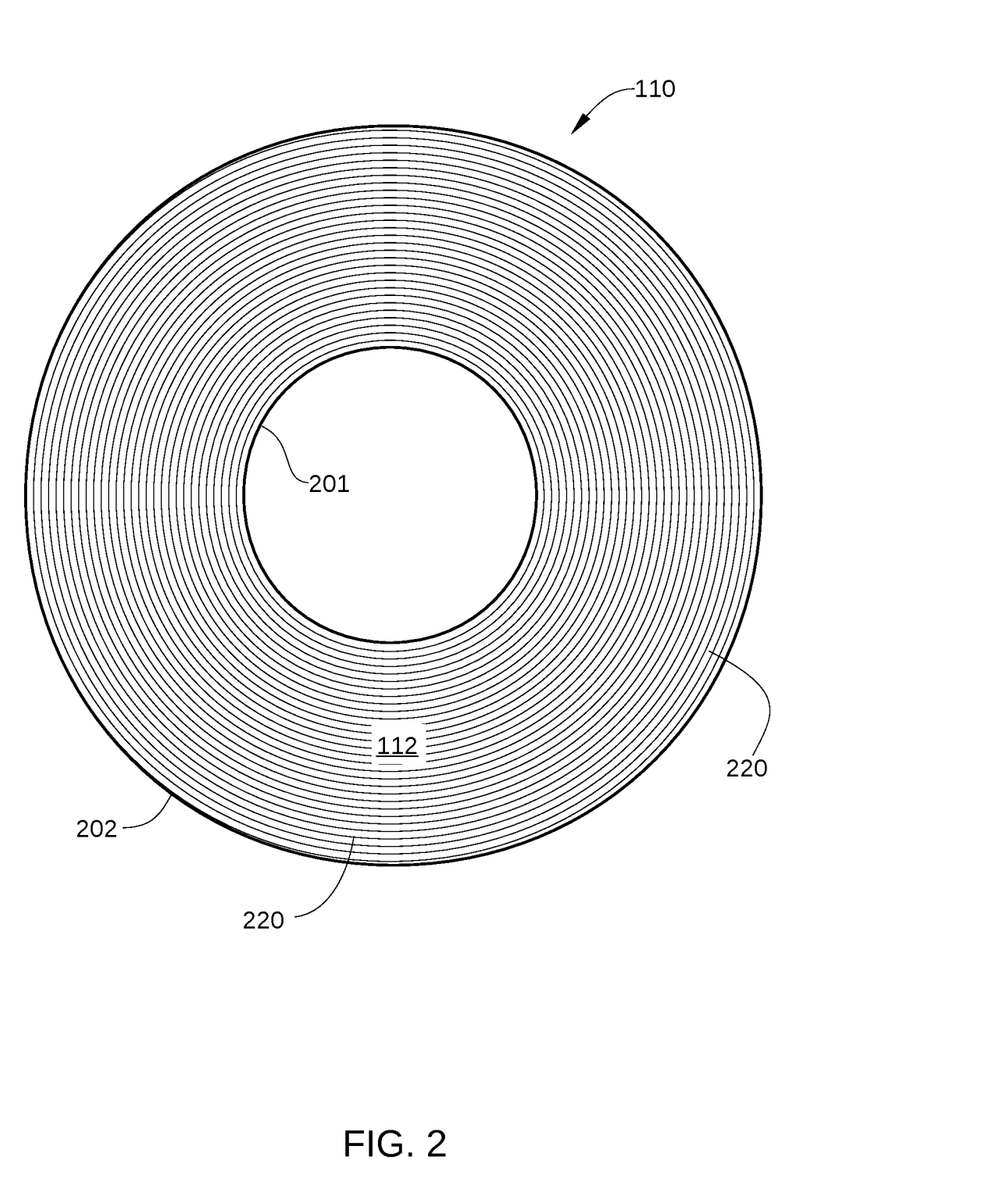
FIG. 2 schematically illustrates a recording surface of a storage disk with concentric data storage tracks formed thereon, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220.

In order for HDD 100 to perform SSW and write the above-described servo wedges on storage disk 110 with the necessary precision for proper operation of HDD 100, position and timing information are provided to the disk drive servo system of HDD 100. The position and timing information that enable the internal servo system of HDD 100 to perform servo self-write (SSW) is typically in the form of reference spiral tracks or "servo spirals" written on storage disk 110. One embodiment of such servo spirals is illustrated in FIG. 3.

Figure 3:
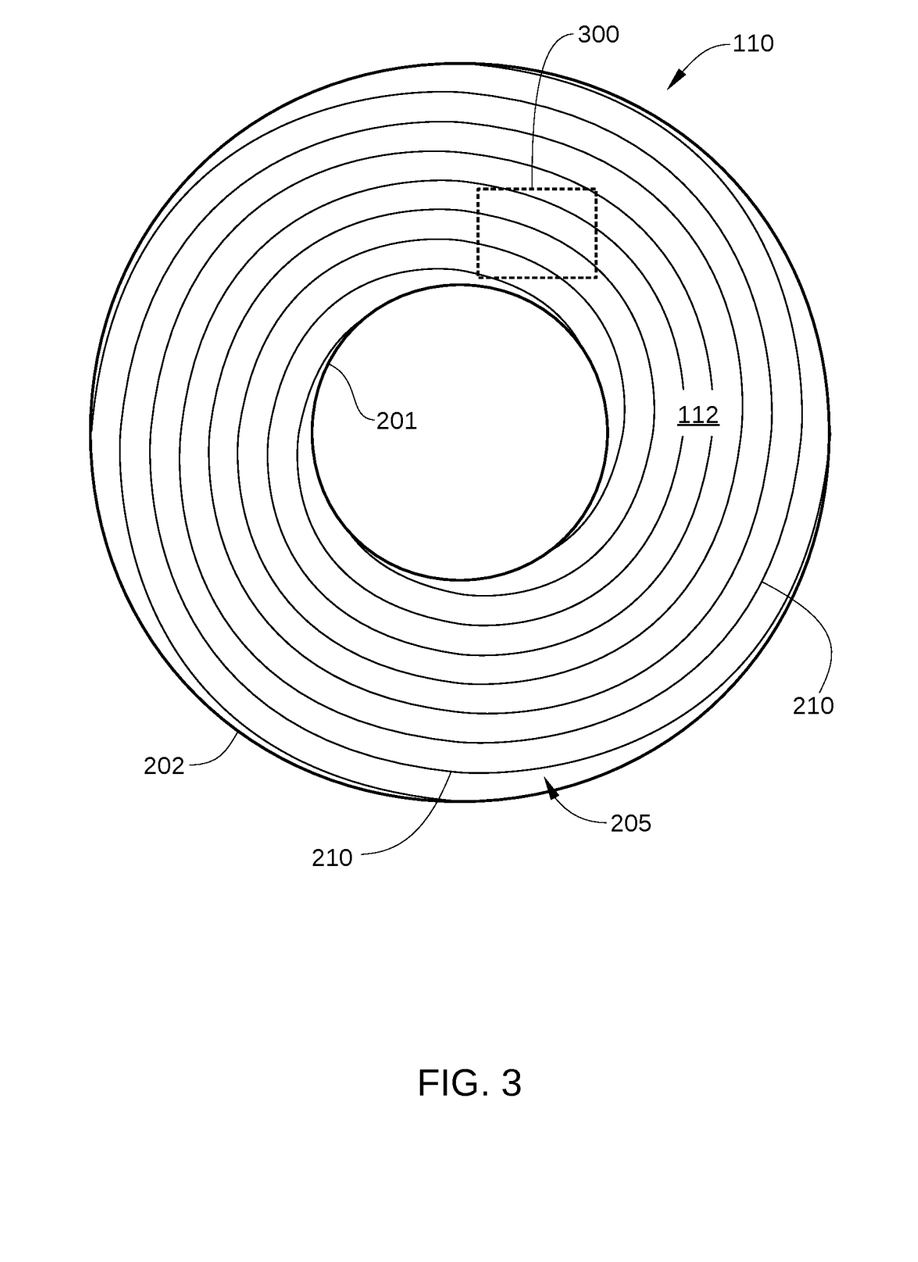
FIG. 3 illustrates storage disk prior to undergoing a SSW process, according to one embodiment.

FIG. 3 illustrates storage disk 110 prior to undergoing a SSW process, according to one embodiment. As shown, storage disk 110 has a spiral set 305 written thereon that includes a plurality of reference spirals 310 that are each circumferentially spaced from adjacent reference spirals 310. It is noted that the number of reference spirals 310 in spiral set 305 is generally larger than that shown in FIG. 3, for example as few as ten or twenty, or as many as several hundred.

Spiral set 305 may be any set of reference spirals configured to provide timing and position information for the servo system of HDD 100 to position a write head while writing another set of reference spirals. Thus, in some embodiments, spiral set 305 is a set of coarse, i.e., initial, reference spirals. In such embodiments, spiral set 305 may be written onto a substantially blank surface 112 of storage disk 110 without the aid of external equipment using read/write head 127 and the servo system of HDD 100, for example, via a bootstrap spiral-writing process. In such a process, references spirals 310 of spiral set 305 are written by read/write head 127 while actuator arm assembly 120 is moved across surface 112 either by applying a suitable open loop voltage or current profile, or by using velocity control based on back EMF feedback. Alternatively, in some embodiments spiral set 305 is a set of fine reference spirals, i.e., reference spirals that are more accurately positioned than coarse reference spirals. In such embodiments, spiral set 305 is written onto surface 112 after surface 112 has another set of the above-described coarse spirals written thereon (not shown for clarity). In such embodiments, reference spirals 310 are typically written onto surface 112 using closed-loop tracking of the previously written coarse reference spirals, and can be used subsequently for writing a more accurately positioned set of servo spirals, such as final reference spirals, that enable the writing of servo sector information on surface 112 by HDD 100 in an SSW process. Thus, reference spirals 310 enable the generation of a set of more accurately positioned reference spirals or the writing of final servo sector information on surface 112 using closed-loop control in the servo system of HDD 100.

Sync-Mark-Induced Repeatable Runout

During a spiral-based SSW process, deviation of head radial position from the nominal target radial position is typically called position error signal (PES). PES can be divided into repeatable runout (RRO) and non-repeatable runout (NRRO), where RRO is the component of PES that repeats during each disk revolution. RRO can be further divided into coherent and non-coherent RRO. Coherent RRO is the component of RRO that is identical in some range of adjacent tracks, while non-coherent RRO is the component of RRO that is different on adjacent tracks. As noted previously, non-coherent RRO is a major source of PES during spiral-based SSW and is ideally minimized in order to provide sufficient head positioning accuracy.

Typically, a conventional spiral signal pattern used in spiral-based SSW is generated via high-frequency magnetic transitions formed on a surface of a storage disk in an HDD, and is divided into frames. Typically, each frame includes 10-100 magnetic transitions and an embedded sync mark. Thus, when a spiral crossing occurs (i.e., when a read head passes over a servo spiral), a read signal is generated that corresponds to the high-frequency transitions of the servo spiral and the interruptions of the high-frequency transitions caused by the sync marks. An example of a conventional read signal is described below in conjunction with FIGS. 4A and 4B.

Figures 4A, 4B:
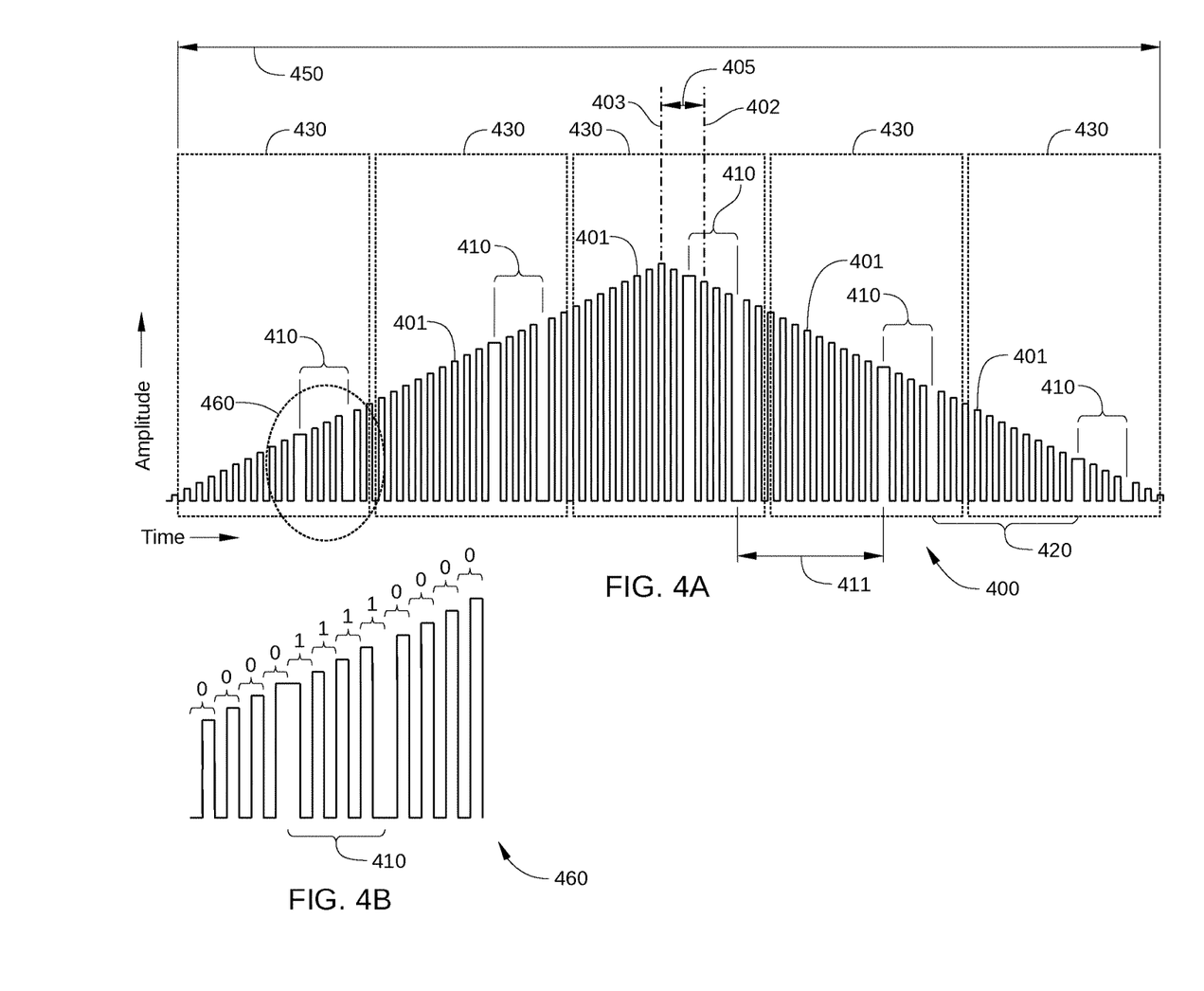
FIG. 4A schematically illustrates a conventional read signal that is generated during a spiral crossing.
FIG. 4B is a more detailed illustration of a portion of the read signal indicated in FIG. 4A that includes a sync mark.

FIG. 4A schematically illustrates a conventional read signal 400 that is generated during a spiral crossing. For example, in some instances, the spiral crossing occurs during an SSW process. FIG. 4B is a more detailed illustration of a portion 460 of read signal 400 indicated in FIG. 4A that includes a sync mark 410. As shown, read signal 400 includes a plurality of signals 401 of various amplitudes that are read by a read/write head during a demodulation window 450. Each signal 401 corresponds to a different magnetic transition included in a particular servo spiral, and as a read head crosses a servo spiral, signals 401 are generated from left to right. Certain signals 401 correspond to sync marks 410, which each provide a clocking signal for an SSW process, and certain signals 401 correspond to spiral amplitude integration signals 420, which each provide spiral amplitude integration information for the SSW process. There is a constant interval 411 in time between sync marks 410 that is independent of the radial location of the read head. Constant intervals 411 enable a servo write clock to maintain synchronization while product servo sectors are written to a disk surface.

Read signal 400 is organized into multiple frame integration windows 430 (also referred to as "spiral frames" or "frame amplitude integration gates"). In the example illustrated in FIG. 4, each frame integration window 430 is configured as a 16-bit spiral frame, where the 0's and 1's are indicated via Manchester encoding. That is, Manchester encoding is used to embed sync marks 410 in the high-frequency transitions of the servo spiral. In Manchester encoding, a 0-1 magnetic transition is typically used to encode 0's, and a 1-0 magnetic transition is used to encode 1's, as illustrated in FIG. 4B. Thus, in the example 16-bit integration windows 430 illustrated in FIG. 4A, the magnetic transitions on the disk encode the following binary signal: 0000 0000 0011 1100, where "1111" indicates a sync mark 410.

For position demodulation, the magnitude of signals 401 for each frame integration window 430 is integrated during a spiral crossing by convolving read signal 400 with a sinusoidal signal that has the same frequency as the spiral signal frequency. During such an amplitude integration process, the 1-0 transitions are integrated with opposite sign compared to the 0-1 transitions. Therefore, each sync mark 410 reduces the integrated amplitude of the corresponding frame integration window 430. This amplitude reduction depends on the amplitude of the particular sync mark 410 within a frame integration window 430.

As a read head moves radially relative to the disk surface, the "eye" pattern (schematically illustrated as a triangle shape in FIG. 4) shifts left or right, while sync marks 410 remain substantially fixed. Sync marks 410 are used to generate a timing signal that is phase locked to the disk rotation. The shift in the location of the eye pattern relative to the disk locked timing signal provides spiral PES for servoing the read head, and is determined based on the center of weight of the integrated amplitudes of the frame integration windows 430 for each spiral crossing. Because sync marks 410 reduce the amplitude of the containing frame integration window 430 during spiral amplitude integration, a measured center of weight 402 of read signal 400 is distorted by the relative location of sync marks 410 with respect to an ideal center 403 of read signal 400. Thus, an error 405 in the measured position is generated that is based on the difference between measured center of weight 402 of read signal 400 and ideal center 403 of read signal 400. This error 405 is generally different for each spiral crossing, and therefore contributes significantly to non-coherent RRO and increased track misregistration.

Sync-Mark Positioning for Low RRO

According to various embodiments, frame integration windows associated with a particular spiral crossing are positioned relative to sync marks so that the sync marks occur partially or completely outside of the frame integration windows and therefore do not contribute to non-coherent RRO. One such embodiment is illustrated in FIG. 5.

Figure 5:
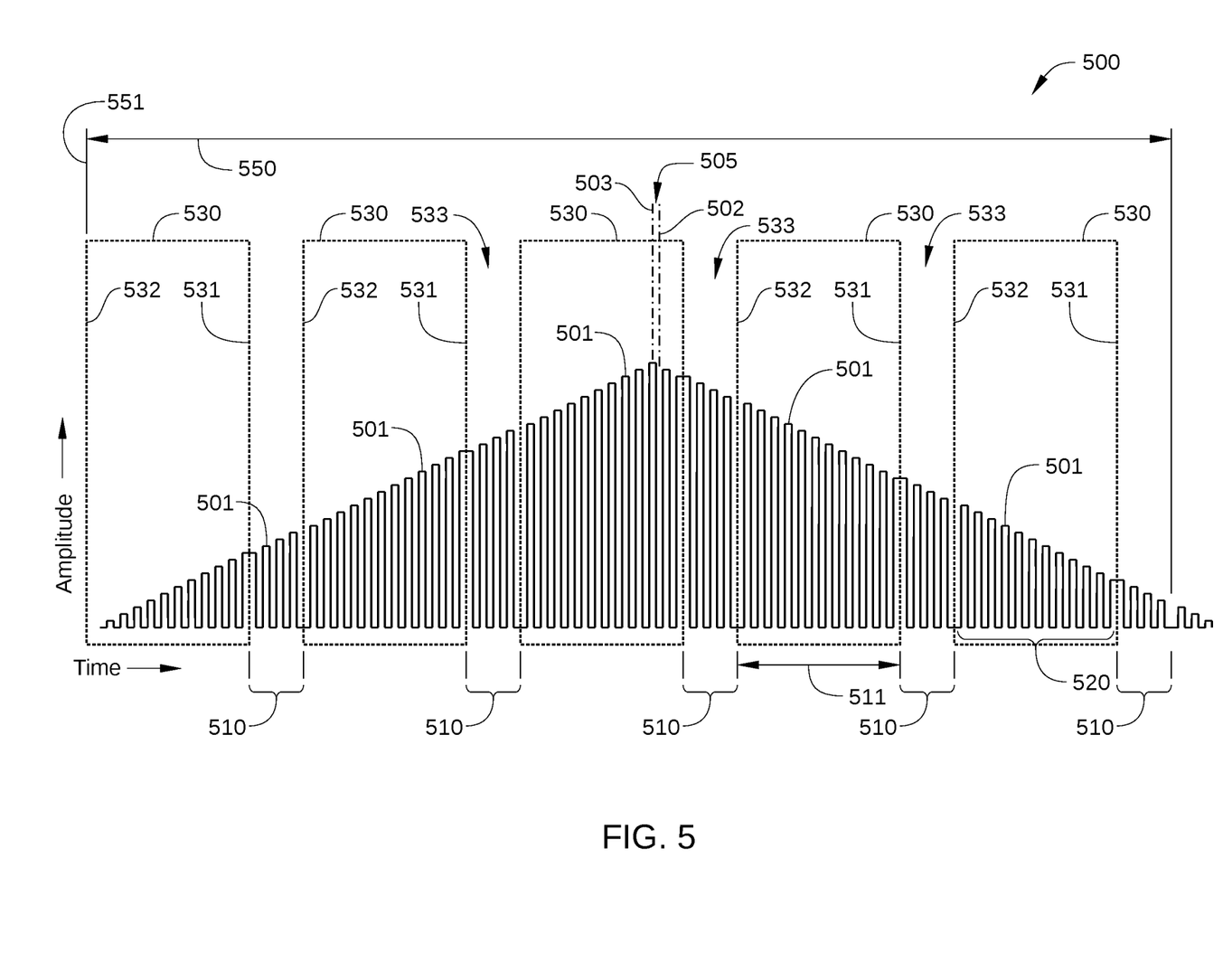
FIG. 5 schematically illustrates a read signal that is generated during a spiral crossing, according to various embodiments.

FIG. 5 schematically illustrates a read signal 500 that is generated during a spiral crossing, according to various embodiments. Read signal 500 includes a plurality of signals 501 that are read by a read/write head during a demodulation window 550 and each correspond to a different magnetic transition included in a particular servo spiral. Similar to read signal 400 in FIG. 4, certain signals 501 correspond to spiral amplitude integration signals 520, and certain signals 501 correspond to sync marks 510, which are separated in time by a constant interval 511. Unlike read signal 400, read signal 500 is organized into multiple frame integration windows 530 that are positioned in time relative to sync marks 510 so that sync marks 510 are disposed partially or completely outside of frame integration windows 530. For example, in the embodiment illustrated in FIG. 5, each sync mark 510 of read signal 500 is disposed after an end time 531 of the immediately preceding frame integration window 510 and before a start time 532 of the immediately following frame integration window 510. Thus, in the embodiment, each sync mark 510 of read signal 500 is disposed within a gap 533 between two adjacent frame integration windows 530. As a result, a measured center of weight 502 of read signal 500 undergoes little or no distortion by sync marks 510, and there is little or no error 505 between measured center of weight 502 and ideal center 503.

In the embodiment illustrated in FIG. 5, each sync mark 510 of read signal 500 is disposed entirely outside of frame integration windows 530. In other embodiments, sync marks are disposed partially outside and partially inside of the frame integration windows associated with a spiral crossing. One such embodiment is described below in conjunction with FIG. 6.

Figure 6:
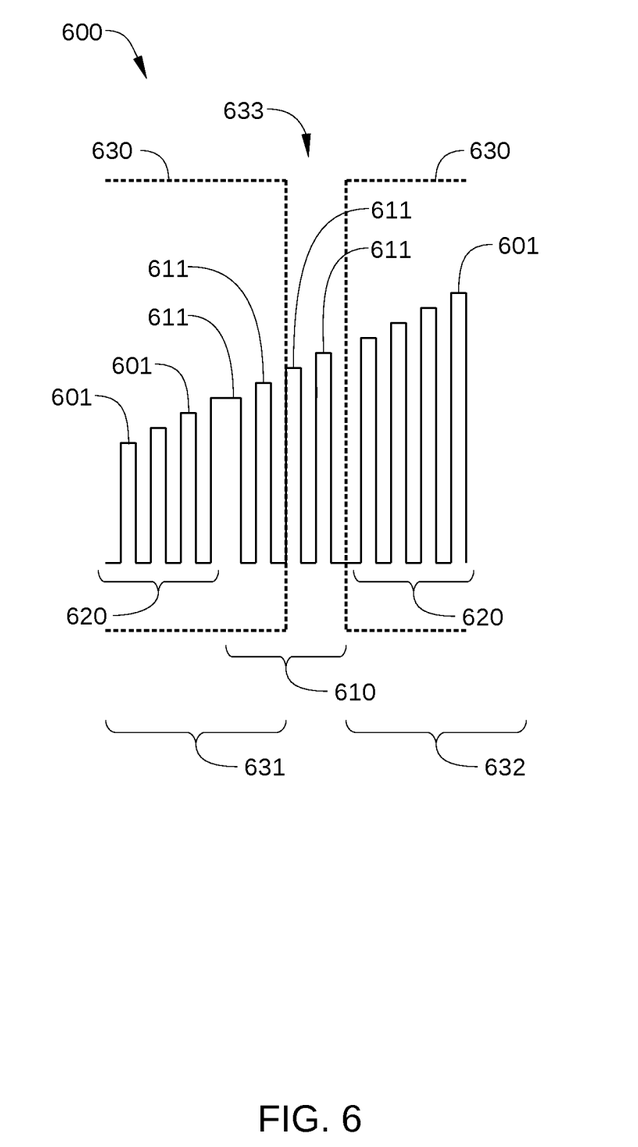
FIG. 6 schematically illustrates two frame integration windows of a read signal that is generated during a spiral crossing, according to various embodiments.

FIG. 6 schematically illustrates two frame integration windows 630 of a read signal 600 that is generated during a spiral crossing, according to various embodiments. Read signal 600 is similar to read signal 500 in FIG. 5, and includes a plurality of signals 601 that are read by a read/write head during a demodulation window (not shown). In addition, certain signals 601 correspond to spiral amplitude integration signals 620, and certain signals 601 correspond to a sync mark 610. Unlike read signal 500, read signal 600 is organized into multiple frame integration windows 630 that are positioned in time relative to sync mark 610 so that sync mark 610 is disposed partially outside of frame integration windows 630 and partially inside a particular frame integration window 630. For example, in the embodiment illustrated in FIG. 6, sync mark 610 consists of four signals 611, and frame integration windows 630 are positioned so that two signals 611 are included at an end portion 631 of a frame integration window 630. Thus, in the embodiment, two of the four signals 611 of each sync mark 610 are disposed within a gap 633 between two adjacent frame integration windows 630. Alternatively, in some embodiments, frame integration windows 630 are positioned so that two signals 611 are included at a beginning portion 632 of a frame integration window 630. In other embodiments, frame integration windows 630 are positioned so that more than two signals 611 of sync mark 610 are included in end portion 631 (or beginning portion 632) of a frame integration window 630. In yet other embodiments, frame integration windows 630 are positioned so that a single signal 611 of sync mark 610 is included in end portion 631 (or beginning portion 632) of a frame integration window 630. Thus, in such embodiments, three of the four signals 611 of each sync mark 610 are disposed within gap 633.

In embodiments in which each sync mark 610 of read signal 600 is disposed partially inside a corresponding frame integration window 630, as shown in FIG. 6, the signals 611 that are included in the frame integration window 630 can have some effect on a measured center of weight of read signal 600. However, in such embodiments, sync marks 610 are associated with a reduced contribution to non-coherent RRO compared to sync marks in a conventional SSW process. Specifically, a smaller portion of sync mark 610 is included in the corresponding frame integration window 630 than in a conventional SSW process. Therefore, the drop in amplitude caused by signals 611 during spiral amplitude integration is reduced, and has less effect on a measured center of weight (not shown) of read signal 600 than a sync mark that is positioned entirely within a frame integration window, as is the case in a conventional SSW process.

It is noted that in conventional servo spirals, frame integration windows are typically configured to include as many bits (high-frequency transitions) as practicable, as illustrated by frame integration windows 430 in FIG. 4A. In this way, signal to noise is maximized when magnetic transition amplitudes are integrated. Accordingly, in conventional servo spirals, the gap between frame integration windows 430 is sized so that the smallest technically feasible number of bits is disposed within the gap. For example, in FIG. 4A, such a gap is sized so that one or zero bits are located between frame integration windows 430. By contrast, according to various embodiments, the gap between the frame integration windows of a servo spiral is sized so that most or all of the bits associated with a sync mark are disposed within the gap. Thus, in FIG. 5, all four of the four signals 501 associated with each sync mark 510 are disposed within gap 533 and, in FIG. 6, two or more of the four signals 611 associated with each sync mark 610 are disposed within gap 633. In sum, in such embodiments, a gap between adjacent frame integration windows includes multiple signals or bits associated with a sync mark.

Figure 7:
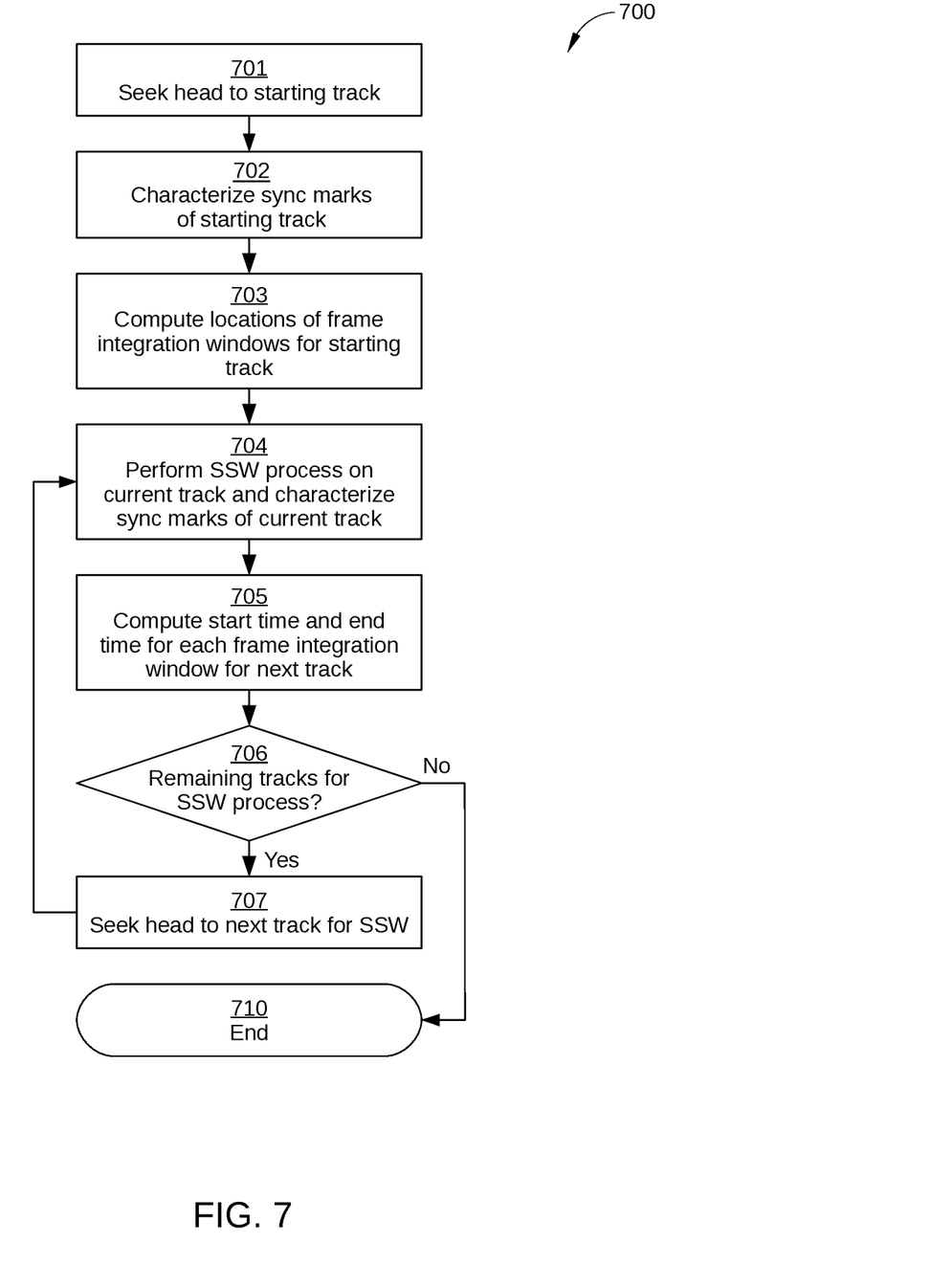
FIG. 7 sets forth a flowchart of method steps for performing an SSW process, according to various embodiments.
Figure 8:
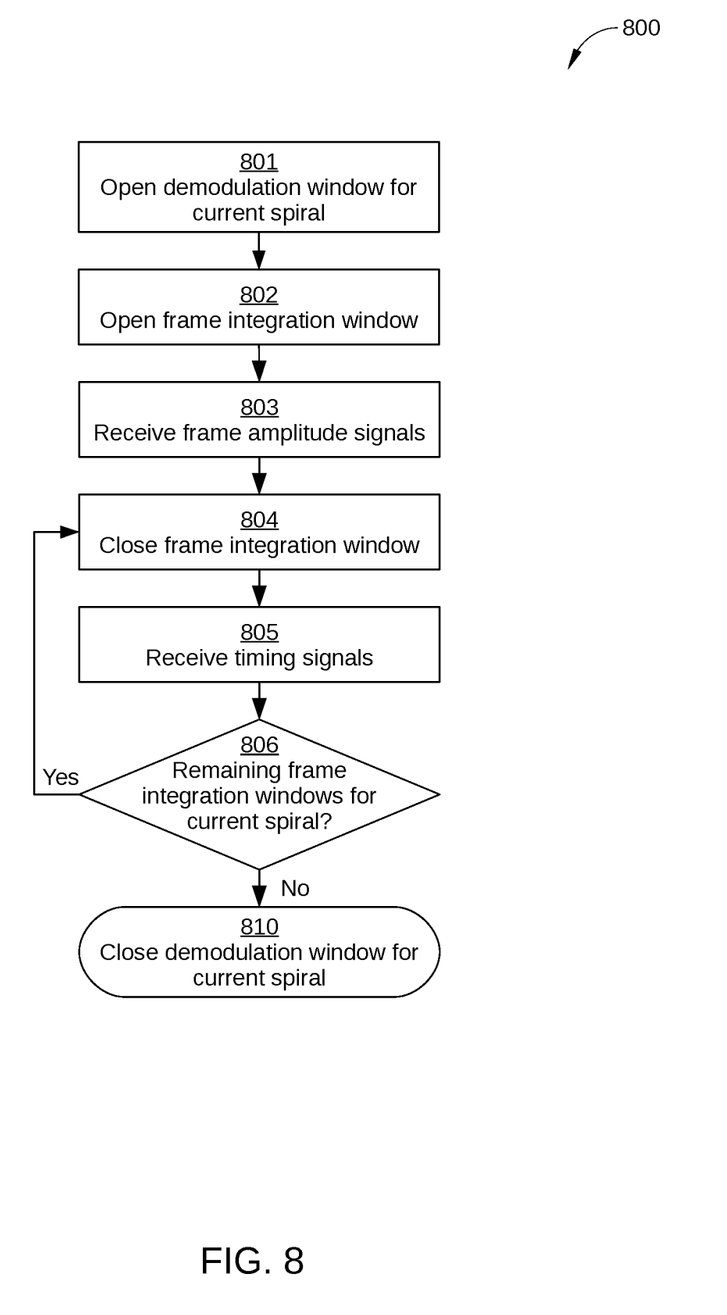
FIG. 8 sets forth a flowchart of method steps for collecting position information during a servo crossing, according to various embodiments.

An SSW process in which an embodiment of read signal 500 and/or read signal 600 is employed is now described in conjunction with FIGS. 7 and 8.

FIG. 7 sets forth a flowchart of method steps for performing an SSW process, according to various embodiments. The method steps may include one or more operations, functions, or actions as illustrated by one or more of blocks 701-710. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-6, persons skilled in the art will understand that the method steps may be performed with other types of systems. The control algorithms for the method steps may reside in microprocessor-based controller 133, some other controller associated with HDD 100, read channel 136, or a combination thereof. The control algorithms can be implemented in whole or in part as software- or firmware-implemented logic, and/or as hardware-implemented logic circuits. Prior to the method steps, spiral set 305 is written or otherwise formed on storage disk 110 of HDD 100, for example as fine guide spirals.

A method 700 begins at step 701, when a suitable controller (e.g., microprocessor-based controller 133) seeks read/write head 137 to a starting track of the SSW process. In some embodiments the starting track is the closest concentric data storage track 220 to ID 201, in other embodiments the starting track is the closest concentric data storage track 220 to OD 202, and in yet other embodiments the starting track is any suitable concentric data storage track disposed between ID 201 and OD 202.

In step 702, the controller characterizes sync marks 510 over one or more rotations at the starting track. In some embodiments, step 702 is performed while the controller maintains read/write head 137 at a substantially constant radial position relative to storage disk 110 (e.g., the starting track). In some embodiments, the controller maintains the substantially constant radial position of read/write head 137 by radially servoing read/write head 137 based on position information collected from reference spirals 310 of spiral set 305.

In step 703, the controller computes locations (in time) of the frame integration windows for each servo crossing associated with the starting track. Thus, in step 703, for each servo crossing that occurs while read/write head 137 servos over the start track, start times 532 and end times 531 for each frame integration window 530 associated with the servo crossing are computed so that sync marks 510 occur partially or completely outside frame integration windows 530. As a result, when the controller servos the radial position of read/write head 137 over the start track using start times 532 and end times 531 (computed for each frame integration window 530 in step 703), the read signal 500 for each servo crossing is not significantly affected by asymmetrical positioning of sync marks 510 within frame integration windows 530.

In step 704, the controller performs a SSW process for the current track. In the SSW process, servo wedges that include positioning information are written to storage disk 110 while the controller servos the radial position of read/write head 137 at the current track. According to various embodiments, the controller servos read/write head 137 based on timing and frame amplitude information that is collected during spiral crossings using a start time 532 and an end time 531 for each frame integration window 530 associated with each spiral crossing for the current track. A method of collecting the timing and frame amplitude information during a spiral crossing is described in greater detail below in conjunction with FIG. 8. With the exception of the start track, the start time 532 and end time 531 for each frame integration window 530 for the current track are computed based on timing information collected for the sync marks 510 of a track that has undergone the SSW process prior to the current track. Typically, this track is the adjacent and immediately preceding track.

In addition, as part of the SSW process, the controller characterizes sync marks 510 of the current track. Thus, in some embodiments, the controller collects timing information for sync marks 510 while servoing read/write head 137 over the current track that is undergoing the SSW process. For example, in some embodiments, read/write channel 137 generates a time stamp of the current value of a particular counter when read/write channel 137 detects a sync mark 510, thereby precisely capturing the location in time of each sync mark 510. In some embodiments, the controller also characterizes or determines when a demodulation window 550 should occur for each servo spiral. In such embodiments, the timing of frame integration windows 530 for a particular servo spiral may be based on a start time 551 of the demodulation window 550 for that particular servo spiral. In some embodiments (as described below), the collected timing information is employed for a track that undergoes an SSW process after the current track.

In step 705, the controller computes a start time 532 and an end time 531 for each frame integration window 530 associated with each spiral crossing for the next track to undergo the SSW process. Because the location in time of sync marks 510 changes very slowly across the stroke of HDD 100, a start time 532 and an end time 531 that are computed based on location information for the sync marks 510 of one track can be employed for the sync marks 510 of an adjacent or nearby track without introducing significant error. Thus, in step 705, the start time 532 and the end time 531 for each frame integration window 530 associated with the next track to undergo the SSW process are computed based on location information collected for the sync marks 510 of the current track.

In step 706, the controller determines whether there are any remaining tracks to undergo the SSW process. If yes, method 700 proceeds to step 707; if no method 700 proceeds to step 710 and terminates. In step 707, the controller seeks to the next track to undergo the SSW process, and method 700 returns to step 704.

FIG. 8 sets forth a flowchart of method steps for collecting position information during a servo crossing, according to various embodiments. For example, in some embodiments, the position information collected includes timing (or clocking) information and amplitude information. In such embodiments, the timing information is based on a location in time of each sync mark associated with the servo crossing, and the amplitude information is based on the amplitudes of signals that each correspond to a different magnetic transition included in the spiral crossing (e.g., signals 501 in FIG. 5).

The method steps may include one or more operations, functions, or actions as illustrated by one or more of blocks 801-810. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-7, persons skilled in the art will understand that the method steps may be performed with other types of systems. The control algorithms for the method steps may reside in microprocessor-based controller 133, some other controller associated with HDD 100, read channel 136, or a combination thereof. The control algorithms can be implemented in whole or in part as software- or firmware-implemented logic, and/or as hardware-implemented logic circuits. Prior to the method steps, a suitable controller seeks read/write head 137 to a specific track that is to undergo an SSW process.

A method 800 begins at step 801, when a suitable controller (e.g., microprocessor-based controller 133) opens a demodulation window 550 for demodulating position information included in a particular servo spiral. In some embodiments, a disk locked timing signal is used to open demodulation window 550. Generally, step 801 is performed as read/write head 137 approaches the particular servo spiral, referred to herein as the "current servo spiral."

In step 802, the controller opens a frame integration window 530 for the current servo spiral, based on a start time 532 computed previously. As described above in conjunction with FIG. 6, start time 532 is selected so that sync marks 510 are disposed at least partially outside of the frame integration window 530 opened in step 802.

In step 803, the controller receives frame amplitude signals associated with the current spiral, such as signals 501 that occur within the frame integration window 530 that was opened in step 802. For example, the controller typically receives the frame amplitude signals via read/write channel 137 when read/write head 127 crosses individual magnetic transitions included in the current servo spiral.

In step 804, the controller closes the frame integration window 530 opened in step 802, based on an end time 531 computed previously. As described above in conjunction with FIG. 6, end time 531 is selected so that sync marks 510 are disposed at least partially outside of the frame integration window 530 closed in step 804.

In step 805, the controller receives timing signals that are associated with a sync mark 510 of the current servo spiral. For example, in some embodiments, the timing signals are signals 501 that occur outside of any frame integration window 530 of the current servo spiral. In other embodiments, the timing signals are signals 501 that are associated with a particular sync mark 510, where the sync mark 510 is at least partially outside of any frame integration window 530 of the current servo spiral. Typically, the controller receives the timing signals in step 805 via read/write channel 137 when read/write head 127 crosses individual magnetic transitions that are included in the current servo spiral and have an opposite polarity to the magnetic transitions that make up the majority of the current servo spiral. Further, at least some of the magnetic transitions associated with the timing signals received in step 805 are disposed outside of any frame integration window 530 for the current servo spiral.

In step 806, the controller determines whether there are any remaining frame integration windows 530 for the current servo spiral. If yes, method 800 returns to step 802; if no, method 800 proceeds to step 810. In step 810, the controller closes the demodulation window 550 for the current servo spiral.

While the foregoing is directed to embodiments of the present invention, other and further embodiments of the invention may be devised without departing from the basic scope thereof, and the scope thereof is determined by the claims that follow.

I claim:

1. A method for collecting position information in a disk drive having a read head and a disk with a set of spirals formed thereon, the method comprising:
    while the read head crosses a first spiral included in the set of spirals, opening a first frame integration window;
    while the first frame integration window is open, generating first signals with the read head as the read head crosses over a first set of magnetic transitions;
    closing the first frame integration window;
    after closing the first frame integration window, generating second signals with the read head as the read head crosses over a second set of magnetic transitions; and
    determining a radial position of the read head by integrating amplitudes of the first signals,
    wherein the first set includes magnetic transitions having a first polarity, and the second set includes two or more magnetic transitions having a second polarity.

2. The method of claim 1, further comprising, after the read head crosses the second set of magnetic transitions and while the read head crosses the first spiral, opening a second frame integration window, and while the second frame integration window is open, generating additional first signals with the read head as the read head crosses over a third set of magnetic transitions.

3. The method of claim 2, wherein:
    the third set includes magnetic transitions having the first polarity and magnetic transitions having the second polarity; and
    the magnetic transitions included in the third set and having the second polarity are adjacent to the second set of magnetic transitions.

4. The method of claim 1, further comprising determining the radial position of the read head by determining a timing associated with the read head based on the second signals.

5. The method of claim 1, wherein the first set includes magnetic transitions having the first polarity and magnetic transitions having the second polarity which are adjacent to the second set of magnetic transitions, and the second set includes no magnetic transitions having the first polarity.

6. The method of claim 5, wherein the magnetic transitions having the second polarity that are adjacent to the second set of magnetic transitions are included in an end portion of the first frame integration window.

7. The method of claim 1, wherein the first frame integration window is included in a plurality of frame integration windows associated with the first spiral, and the first signals are generated by the read head as the read head crosses over magnetic transitions while the first frame integration window is open.

8. The method of claim 1, wherein opening the first frame integration window comprises opening the first frame integration window based on a start time for the first frame integration window that is associated with servoing the read head at a first data storage track while the read head crosses the first spiral.

9. The method of claim 8, further comprising determining the start time based on timing signals generated with the read head while servoing the read head at a second data storage track.

10. The method of claim 9, wherein the second data storage track is radially adjacent to the first data storage track.

11. The method of claim 1, wherein closing the first frame integration window comprises closing the first frame integration window based on an end time for the first frame integration window that is associated with servoing the read head at a first data storage track while the read head crosses the first spiral.

12. The method of claim 11, further comprising determining the end time based on timing signals generated with the read head while servoing the read head at a second data storage track.

13. The method of claim 12, wherein the second data storage track is radially adjacent to the first data storage track.

14. The method of claim 1, further comprising performing a servo self-writing process on the disk based on the first signals and the second signals.

15. A disk drive, comprising:
a read head;
a disk with a set of spirals formed thereon; and
a controller configured to perform the steps of:
while the read head crosses a first spiral included in the set of spirals, opening a first frame integration window;
while the first frame integration window is open, generating first signals with the read head as the read head crosses over a first set of magnetic transitions;
closing the first frame integration window;
after closing the first frame integration window, generating second signals with the read head as the read head crosses over a second set of magnetic transitions; and
determining a radial position of the read head by integrating amplitudes of the first signals,
wherein the first set includes magnetic transitions having a first polarity, and the second set includes two or more magnetic transitions having a second polarity.

16. The disk drive of claim 15, wherein the steps further comprise: after the read head crosses the second set of magnetic transitions and while the read head crosses the first spiral, opening a second frame integration window, and while the second frame integration window is open, generating additional first signals with the read head as the read head crosses over a third set of magnetic transitions.

17. The disk drive of claim 16, wherein:
the third set includes magnetic transitions having the first polarity and magnetic transitions having the second polarity; and
the magnetic transitions included in the third set and having the second polarity are adjacent to the second set of magnetic transitions.

18. The disk drive of claim 15, wherein the first set includes magnetic transitions having the first polarity and magnetic transitions having the second polarity which are adjacent to the second set of magnetic transitions, and the second set includes no magnetic transitions having the first polarity.

19. The disk drive of claim 18, wherein the magnetic transitions having the second polarity that are adjacent to the second set of magnetic transitions are included in an end portion of the first frame integration window.

20. The disk drive of claim 15, wherein opening the first frame integration window comprises opening the first frame integration window based on a start time for the first frame integration window that is associated with servoing the read head at a first data storage track while the read head crosses the first spiral.

* * * * *